(12) United States Patent
Koyama et al.

(10) Patent No.: US 7,591,359 B2
(45) Date of Patent: Sep. 22, 2009

(54) CLUTCH RELEASE MECHANISM

(75) Inventors: Shinya Koyama, Saitama (JP); Hitoshi Yokotani, Saitama (JP); Hiroatsu Inui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 452 days.

(21) Appl. No.: 11/642,617

(22) Filed: Dec. 21, 2006

(65) Prior Publication Data

US 2007/0144862 A1 Jun. 28, 2007

(30) Foreign Application Priority Data

Dec. 27, 2005 (JP) ............... 2005-376520

(51) Int. Cl.
*F16D 13/00* (2006.01)
(52) U.S. Cl. ............ 192/89.21; 192/89.23; 192/89.26
(58) Field of Classification Search ........... 192/89.21, 192/89.23, 89.26
See application file for complete search history.

(56) References Cited

U.S. PATENT DOCUMENTS

| | | | | |
|---|---|---|---|---|
| 3,443,673 A | * | 5/1969 | Rosenberger | ............. 192/91 R |
| 4,425,989 A | * | 1/1984 | Gotoda | ............. 192/48.92 |
| 4,585,105 A | * | 4/1986 | Iio et al. | ............. 228/139 |
| 4,645,049 A | * | 2/1987 | Matsuda et al. | ............. 192/35 |
| 4,753,330 A | * | 6/1988 | Ohzono et al. | ............. 192/48.4 |

FOREIGN PATENT DOCUMENTS

JP 2000-220660 A 8/2000

* cited by examiner

*Primary Examiner*—Ha D. Ho
(74) *Attorney, Agent, or Firm*—Birch, Stewart, Kolasch & Birch, LLP

(57) ABSTRACT

To provide a clutch release mechanism which can restrain vibrations of a ball while allowing the ball to be loosely fitted when it is not in operation to ensure the engaged state of a clutch. A clutch release mechanism is configured in such a manner that a gap is defined between a clutch cam plate or a receiving plate and a ball unit so that the ball unit can slide between the clutch cam plate and the receiving plate. An urging spring is provided for urging the ball unit in the direction of being slid toward the clutch cam plate. A C-ring for restricting the ball unit from coming out from a boss member is attached to the peripheral portion of the boss member.

20 Claims, 6 Drawing Sheets

CLUTCH RELEASE MECHANISM

CROSS-REFERENCE TO RELATED APPLICATIONS

The present application claims priority under 35 USC 119 to Japanese Patent Application No. 2005-376520 filed on Dec. 27, 2005 the entire contents of which are hereby incorporated by reference.

BACKGROUND OF THE INVENTION

1. Field of the Invention

The present invention relates to a clutch release mechanism for releasing engagement of a clutch device provided on a power unit in a motor cycle, a buggy or the like.

2. Description of Background Art

In the related art, there is a clutch release mechanism configured in such a manner that a ball is interposed between a fixed cam plate and a movable cam plate opposing to each other so that engagement of a clutch is released by pressing a release plate of a clutch device using a thrust force generated by the relative rotation of the both cam plates. See, for example, JP-A-2000-220660.

When the clutch release mechanism in configured in this manner it is not in operation, it is generally required to allow the ball to be loosely fitted by providing a slight gap among the fixed cam plate, the ball and the movable cam plate for ensuring the engaged state of the clutch. However, in the structure in the related art as described above, when the ball is loosely fitted between the fixed cam plate and the movable cam plate, there is a possibility that the ball is vibrated when an engine is in operation which results in a noise being made. In addition, since three of the fixed cam plate, the ball, and the movable cam plate are independent respectively as parts, the number of components is large. Thus, assembleability is low.

SUMMARY AND OBJECTS OF THE INVENTION

In view of such a problem, it is an object of the invention to provide a clutch release mechanism which can restrain vibrations of the ball while allowing the ball to be loosely fitted when it is not in operation to ensure the engaged state of the clutch. Thus, the assembleability is improved.

In order to achieve the object as described above, an embodiment of the present invention provides a clutch release mechanism for releasing engagement of a clutch device including a collar member which can press a pressurizing plate of the clutch device in the direction of releasing engagement of the clutch device, a bearing (for example, a release bearing 55 in an embodiment) provided inside the collar member. A clutch cam plate is rotatably connected to the collar member via the bearing with an adjustment bolt being held by a case member for covering the clutch device coaxially with an axis of rotation of the clutch cam plate. A boss member is screwed on the adjustment bolt and formed so as to extend from the adjustment bolt to at least the clutch cam plate coaxially with the axis of rotation of the clutch cam plate. A receiving plate is connected to the peripheral portion of the boss member so as to extend substantially in parallel with the clutch cam plate. A ball unit includes a retainer fitted to the boss member so as to be positioned between the clutch cam plate and the receiving plate with a plurality of balls being rotatably retained by the retainer so as to be arranged in the direction of rotation of the clutch cam plate and configured so that portions exposed when being held by the retainer are engaged respectively with a plurality of cam-like recesses provided on the clutch cam plate.

In the clutch release mechanism in this configuration, a gap is defined between the clutch cam plate or the receiving plate and the ball unit so that the ball unit can slide between the clutch cam plate and the receiving plate. An urging member is provided for urging the ball unit in the direction of being slid toward the clutch cam plate (for example, an urging spring 90 in the embodiment) with a retaining member for restricting the ball unit from coming out from the boss member (for example, a C-ring 91 in the embodiment) being attached to the peripheral portion of the boss member.

In an embodiment of the present invention described above, preferably, the inner surface of the collar member is configured to be capable of coming into abutment with the outer peripheral surface and the side surface facing the clutch device of an outer race which constitutes the bearing, the clutch cam plate is formed with a cylindrical projecting portion extending coaxially with the axis of rotation of the clutch cam plate to rotatably support the cylindrical projecting portion on the outer peripheral portion of the boss member so as to be capable of rotating coaxially with the axis of rotation thereof. The cylindrical projecting portion is arranged inside an inner race which constitutes the bearing and a gap is defined between the outer peripheral surface of the outer race and the inner surface of the collar member so as to extend radially of the bearing.

According to an embodiment of the present invention, since the urging member for urging the ball unit in the direction of being slid toward the clutch cam plate is attached to the peripheral portion of the boss member, when the clutch release mechanism is not in operation, the ball unit comes apart from the receiving plate. Thus, the balls are brought into a loosely fitted state, while the balls are brought into abutment with the cam-like recesses of the clutch cam plate by the urging member. Therefore, vibrations of the balls can be restrained while allowing the balls to be loosely fitted when the clutch release mechanism is not in operation to ensure the engaged state of the clutch device. In addition, since the retaining member for restricting the ball unit from coming out from the boss member is mounted to the peripheral portion of the boss member, the possibility that the ball unit or the urging member comes out from the boss member when assembling the clutch release mechanism can be eliminated. Thus, the assembleability of the clutch release mechanism can be improved.

In addition, since the gap is defined between the outer peripheral surface of the outer race of the bearing and the inner surface of the collar member, eccentricity generated between the clutch release mechanism and the clutch device can be absorbed with a simple configuration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
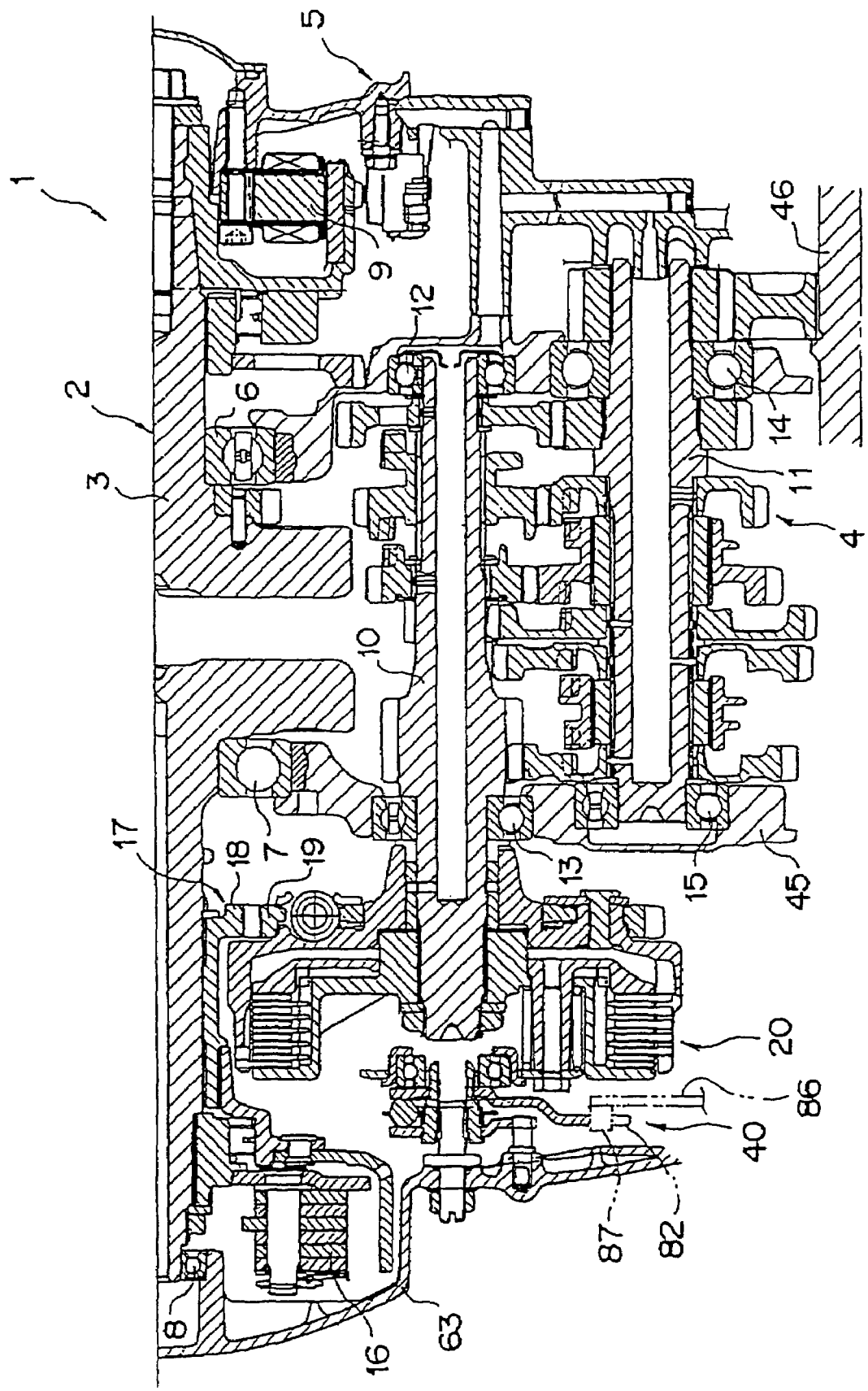
FIG. 1 is a cross-sectional view showing part of a vehicle power unit provided with a clutch release mechanism according to the invention.

Referring now to the drawings, a preferred embodiment of the invention will be described. FIG. 1 shows a vehicle power unit 1 provided with a clutch release mechanism according to an embodiment of the present invention. The power unit 1 mainly includes an engine (internal combustion engine) 2, a transmission 4 for shifting gears and transmitting the speed of a rotational drive force of a crankshaft 3 of the engine 2 obtained thereby to a drive wheel, not shown, and a power unit case 5 for covering these components.

The crankshaft 3 of the engine 2 is rotatably supported by the power unit case 5 via ball bearings 6, 7, 8, and an ACG (alternating power generator) 9 is disposed at one end of the crankshaft 3. A main shaft 10 and a counter shaft 11 of the transmission 4 are disposed substantially in parallel with the crankshaft 3. The main shaft 10 is rotatably supported by a crankcase 45 which constitutes the power unit case 5 via ball bearings 12, 13. In addition, the counter shaft 11 is rotatably supported by the crankcase 45 via ball bearings 14, 15.

The crankshaft 3 of the engine 2 and the main shaft 10 of the transmission 4 are connected to each other via a starting clutch 16, a primary speed-decreasing gear 17 and a clutch device 20. The rotational drive force of the crankshaft 3 is transmitted to the main shaft 10 via the starting clutch 16, the primary speed-decreasing gear 17, and the clutch device 20. The rotational drive force transmitted to the main shaft 10 of the transmission 4 (from the crankshaft 3) is changed by the transmission 4 at a predetermined transmission gear ratio and is transmitted from the counter shaft 11 to a drive wheel, not shown, via an output shaft 46.

The centrifugal starting clutch 16 is disposed at the other end side of the crankshaft 3, and is brought into an engaged state (a state in which the clutch is connected) by the rotation of the crankshaft 3 so that the rotational drive force of the crankshaft 3 is transmitted to a primary drive gear 18 disposed on the crankshaft 3.

Figure 2:
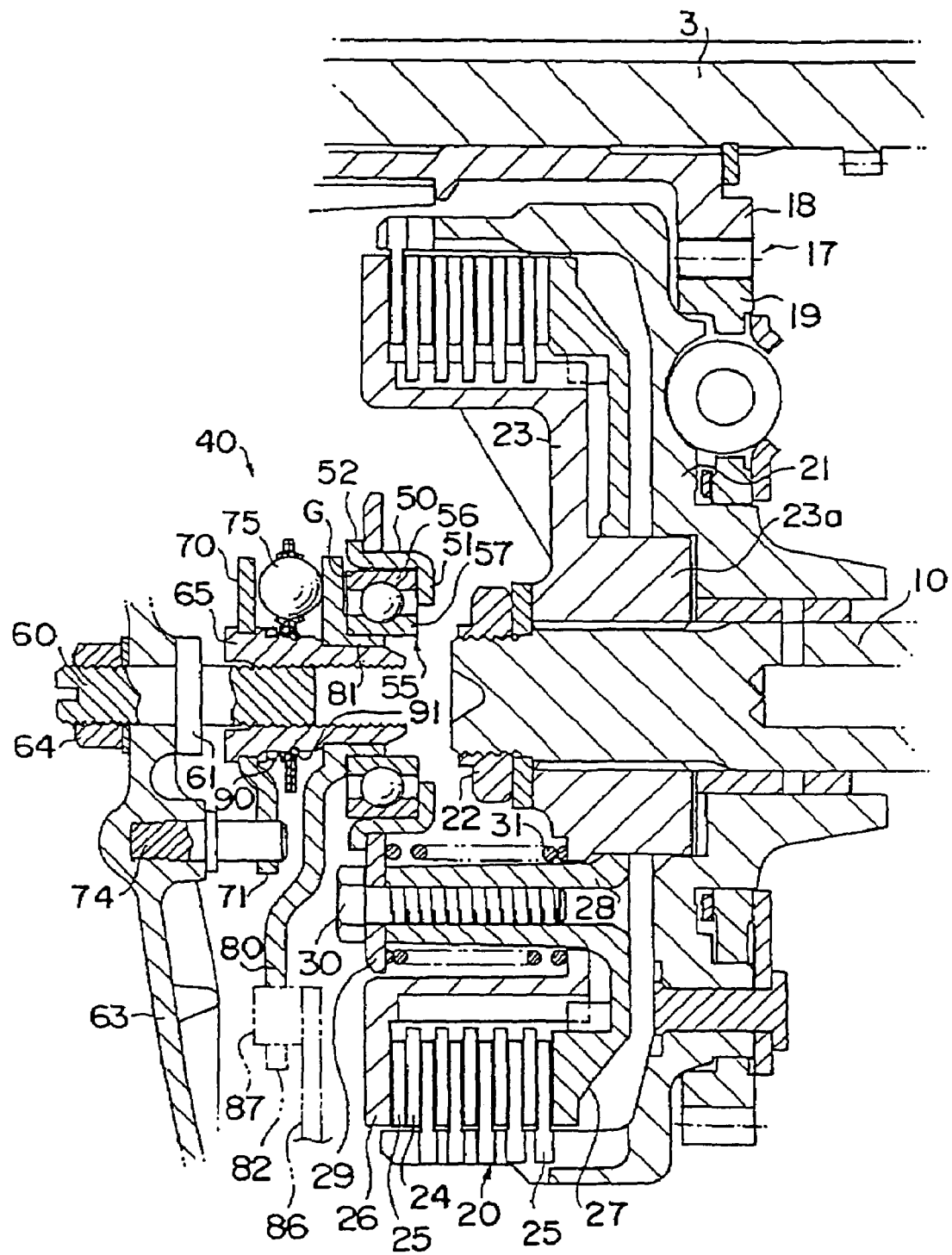
FIG. 2 is an enlarged cross-sectional view of the clutch release mechanism in the power unit.

As shown in FIG. 2 as well, the clutch device 20 is provided with a bottomed cylindrical clutch outer 21 rotatably supported by the main shaft 10 of the transmission 4. A primary driven gear 19, to be meshed with the primary drive gear 18, is mounted to the outside the bottom portion of the clutch outer 21. The primary drive gear 18 includes a relatively small diameter and the primary driven gear 19 includes a diameter larger than the primary drive gear 18 constitute the above-described primary speed-decreasing gear 17.

A bottomed cylindrical clutch inner 23 to be spline-fitted to the main shaft 10 and secured by a nut 22 is disposed inside the clutch outer 21, and a plurality of drive friction disks 24 slidably spline-fitted to the peripheral wall portion of the clutch inner 23 and a plurality of driven friction disks 25 slidably spline-fitted to the peripheral wall portion of the clutch outer 21 are alternately overlapped with each other.

A pressure-receiving plate 26, formed integrally with the clutch inner 23, is placed so as to oppose to the outermost driven friction disk 25 out of the friction disks 24, 25. A pressurizing plate 27 slidably supported by the outer peripheral surface of a boss 23a of the clutch inner 23 is placed so as to be opposed to the innermost driven friction disk 25. The pressurizing plate 27 is integrally formed with a plurality of supporting bosses 28 (only one of those is shown in FIGS. 1 and 2) passing through the bottom portion of the clutch inner 23 so as to project therefrom. A release plate 29 is secured to the bottom ends of the supporting bosses 28 with bolts 30. A clutch spring 31 is provided between the release plate 29 and the bottom portion of the clutch inner 23 in a contracted state.

A clutch release mechanism 40 for releasing the engaged state of the clutch device 20 in this manner mainly includes a collar member 50 which can press the pressurizing plate 27 via the release plate 29 and the supporting bosses 28. A release bearing 55 is provided inside the collar member 50 with a clutch cam plate 80 rotatably connected to the collar member 50 via the release bearing 55. An adjustment bolt 60 is held on the power unit case 5 with a boss member 65 screwed onto the adjustment bolt 60. A receiving plate 70 is connected to the outer periphery portion of the boss member 65 with a ball unit 75 disposed between the clutch cam plate 80 and the receiving plate 70.

The collar member 50 is formed into a cylindrical shape in which the release bearing 55 can be stored therein using a bearing abutment portion 51 formed by bending one end thereof, and is mounted to a center opening of the release plate 29 using a release plate abutment portion 52 formed by bending the other end thereof. The one end of the collar member 50 is bent inwardly, and is formed into the bearing abutment portion 51 which can come into abutment with the side surface of an outer race 56 which constitutes the release bearing 55. Accordingly, when the release bearing 55 is arranged inside the collar member 50, the inner surface of the collar member 50 (the bearing abutment portion 51) comes into abutment with the side surface of the outer race 56 opposing the clutch device 20, and is capable of coming into abutment with the outer peripheral surface of the outer race 56.

At this time, a gap G is defined between the outer peripheral surface of the outer race 56 and the inner peripheral surface of the collar member 50 so as to extend radially of the release bearing 55. Accordingly, eccentricity generated between the clutch release mechanism 40 supported by a front cover 63 of the power unit case 5 and the clutch device 20 supported by the main shaft 10 supported by the crankcase 45 can be absorbed with a simple configuration. On the other hand, the other end of the collar member 50 is bent outwardly so as to form the release plate abutment portion 52 that can be brought into abutment with the release plate 29.

The adjustment bolt 60 is held by the front cover 63 which constitutes the power unit case 5 substantially coaxially with the main shaft 10 of the clutch device 20 (the axis of rotation of the clutch cam plate 80), and is secured to the front cover 63 using a flange 61 integrally formed on the adjustment bolt 60 and a nut 64 which can be screwed onto the adjustment bolt 60. A cylindrical boss member 65 formed with a female screw on the inner side thereof is screwed on one end of the adjustment bolt 60 projecting into the power unit case 5, and extends from the adjustment bolt 60 inwardly of an inner race 57 of the release bearing 55. In this manner, the clutch release mechanism 40 is supported by the front cover 63 using the adjustment bolt 60.

Figure 4:
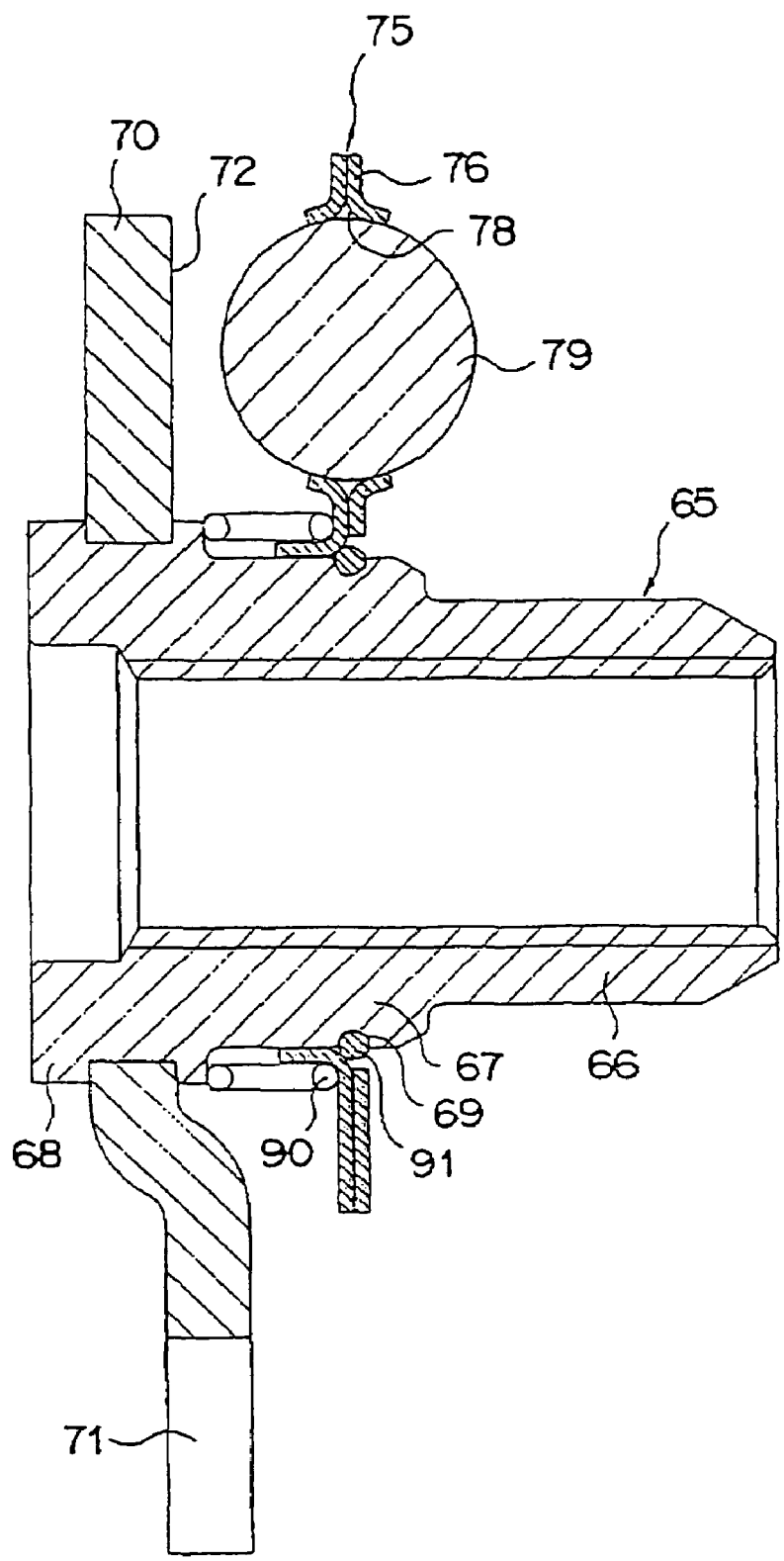
FIG. 4 is a cross-sectional view showing a state in which a ball unit is fitted to a boss member.
Figure 7:
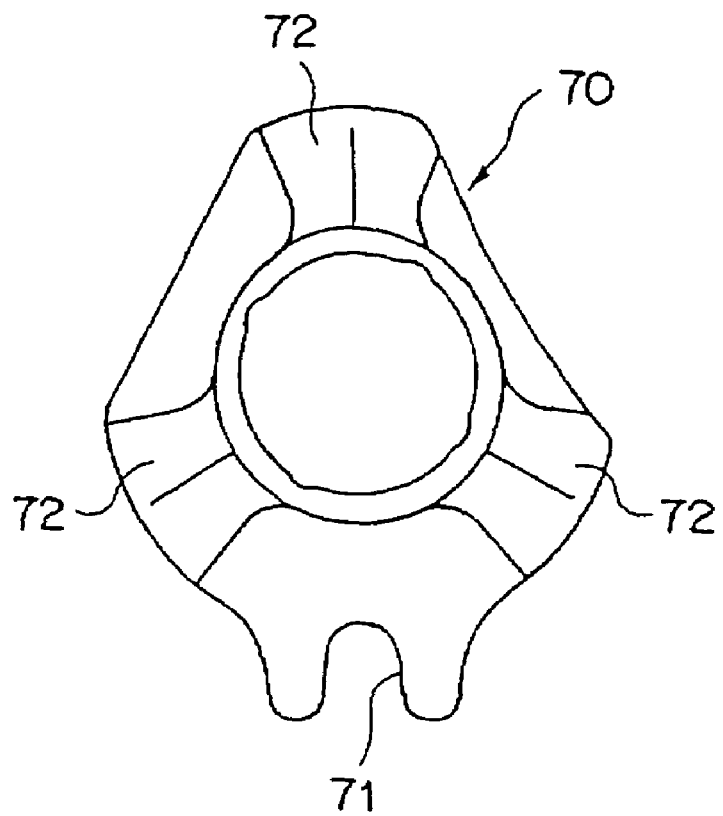
FIG. 7 is a front view of a receiving plate.

As shown in FIG. 4, the boss member 65 is formed at the distal end thereof with a plate supporting portion 66 for supporting a cylindrical projecting portion 81 of the clutch cam plate 80 so as to be capable of rotating coaxially with the main shaft 10. A retainer fitting portion 67 having a diameter slightly larger than the plate supporting portion 66 is formed at the intermediate portion of the boss member 65, so that a retainer 76 of a ball unit 75 is fitted to the retainer fitting portion 67. A receiving plate connecting portion 68, having a diameter slightly larger than the retainer fitting portion 67, is formed at the proximal portion of the boss member 65. Thus, the receiving plate 70 is connected to the outer peripheral portion of the receiving plate connecting portion 68 so as to be substantially in parallel with the clutch cam plate 80. As shown in FIGS. 2 and 7, a pin engagement portion 71, which slidably engages with a rotation preventing pin 74 fixedly provided on the front cover 63, is formed on the periphery of the receiving plate 70, so that the receiving plate 70 and the boss member 65 are prevented from rotating.

Figure 8:
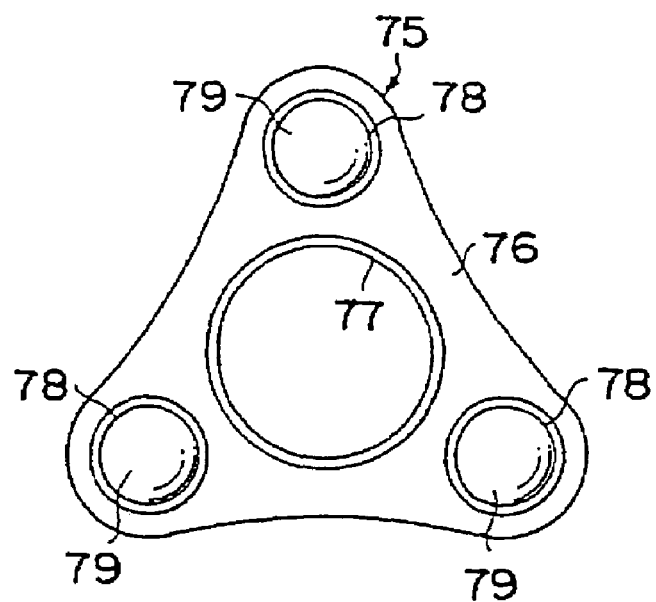
FIG. 8 is a front view of the ball unit.

As shown in FIGS. 2 and 8, the ball unit 75 includes a retainer 76 which is fitted to the boss member 65 so as to be positioned between the clutch cam plate 80 and the receiving plate 70 and three balls 79 rotatably held by the retainer 76 so as to be arranged in the direction of rotation of the clutch cam plate 80. A fitting hole 77, which can be fitted to the retainer fitting portion 67 of the boss member 65, is formed at the center of the retainer 76.

The retainer 76 is formed with three ball holding holes 78 arranged in the direction of rotation of the clutch cam plate 80, that is, at regular intervals in the circumferential direction, so that the balls 79 are rotatably held by the ball holding holes 78. As shown in FIG. 4, the ball holding holes 78 are formed to be shallower than the balls 79, so that both ends of the balls 79 are widely exposed symmetrically. Separation of the balls 79 from the ball holding holes 78 are prevented by squeezing both ends of the ball holding holes 78 by caulking after having inserted the balls 79 into the ball holding holes 78.

The cylindrical projecting portion 81 is formed on the clutch cam plate 80 so as to extend coaxially with the main shaft 10, and is rotatably supported by the plate supporting portion 66 of the boss member 65 coaxially with the main shaft 10. The cylindrical projecting portion 81 is adapted to be arranged (fitted) inside the inner race 57 which constitutes the release bearing 55 in cooperation with the plate supporting portion 66, whereby the clutch cam plate 80 is rotatably connected to the collar member 50 via the release bearing 55 coaxially with the main shaft 10. The plate portion of the clutch cam plate 80, which is located in the vicinity of the cylindrical projecting portion 81, is brought into abutment with the side surface of the inner race 57 on the opposite side from the clutch device 20.

Figure 3:
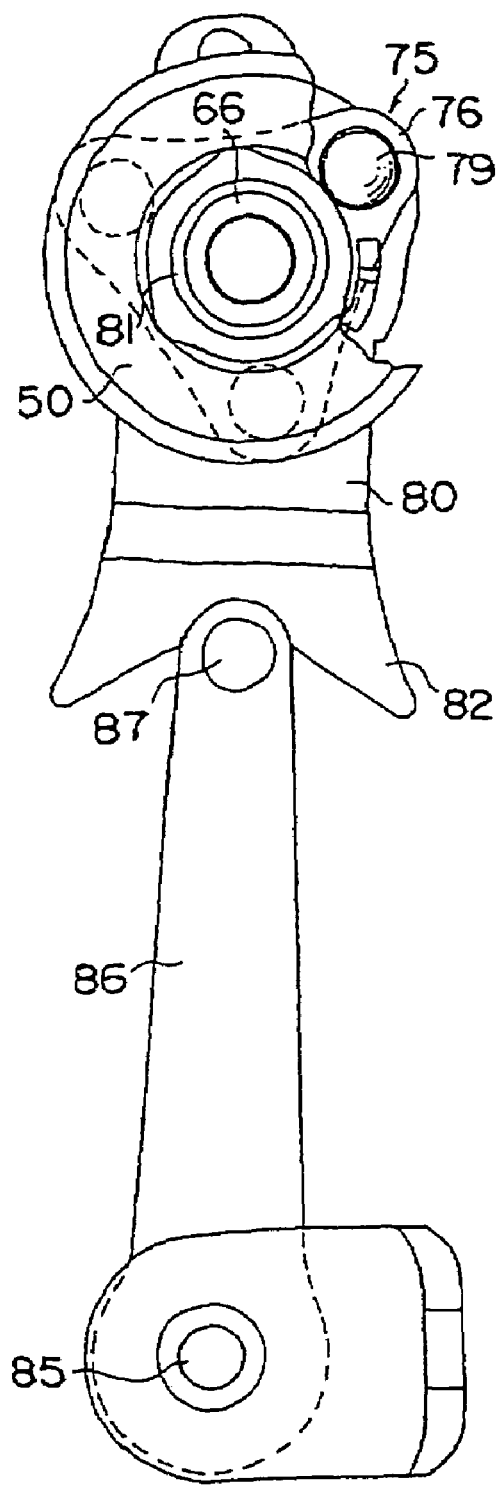
FIG. 3 is an enlarged drawing of a change spindle and a clutch arm.
Figure 5:
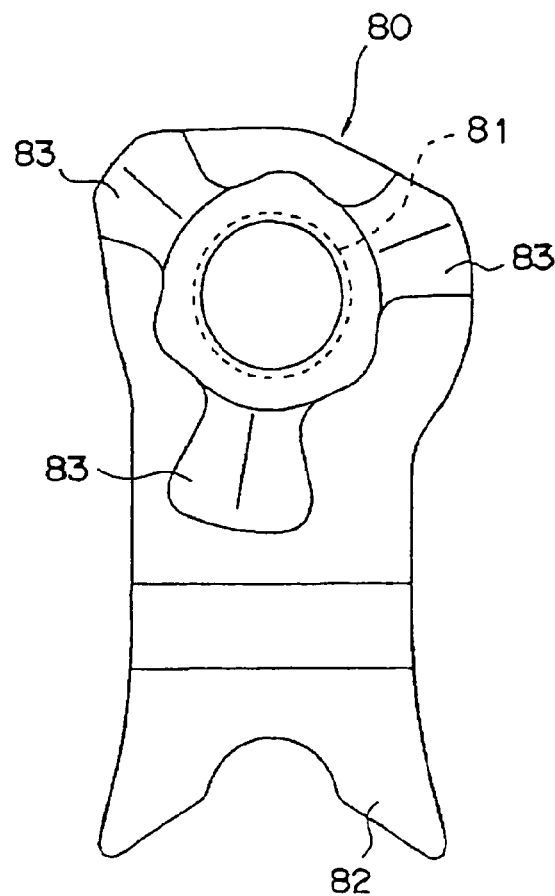
FIG. 5 is a front view of a clutch cam plate.

As shown in FIGS. 3 and 5, the clutch cam plate 80 is integrally formed with a driven arm 82 in a fork shape extending radially of the cylindrical projecting portion 81, so that the distal end portion of a clutch arm 86 secured to one end of a change spindle 85 is engaged with the fork portion of the driven arm 82. A roller 87 is rotatably connected to the distal end of the clutch arm 86, so that the driven arm 82 can be rotated smoothly from the clutch arm 86. The change spindle 85 is supported by the power unit case 5 substantially in parallel with the main shaft 10, so as to be operated to rotate by a change pedal, a motor, not shown, and so on.

Figure 6:
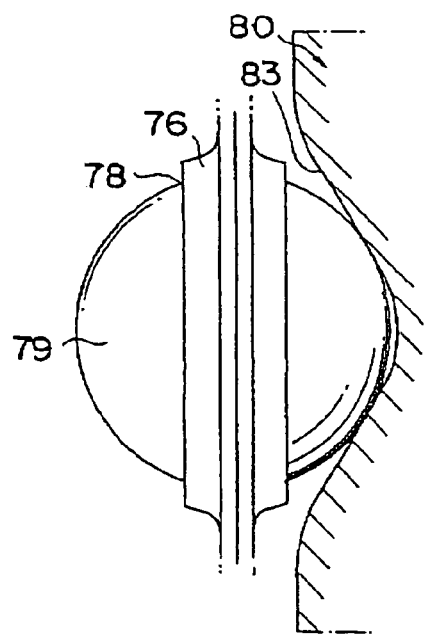
FIG. 6 is a cross-sectional view showing a state in which balls are engaged with cam-like recesses of the clutch cam plate.

As shown in FIG. 5, cam-like recesses 83 are formed on the portions of the clutch cam plate 80 opposing to the ball unit 75 at positions corresponding to the positions of the balls 79. As shown in FIG. 6, the tops of the balls 79 exposed from the ball holding holes 78 on one side are engaged with the respective cam-like recesses 83. On the other hand, as shown in FIG. 7, cam-like recesses 72 are formed on the portion of the receiving plate 70 opposing to the ball unit 75 at positions corresponding to the positions of the balls 79 held by the ball holding holes 78 of the retainer 76, so that the tops of the balls 79 exposed from the ball holding holes 78 into the respective cam-like recesses 72 on the other side are engaged therewith. In this manner, the rotation of the ball unit 75 is restricted by the engagement respectively of both ends of the balls 79 exposed from the ball holding holes 78 with the cam-like recesses 72, 83 of the receiving plate 70 and the clutch cam plate 80.

When the balls 79 of the ball unit 75 are respectively accommodated in the respective cam-like recesses 72, 83, a gap is formed between the clutch cam plate 80 or the receiving plate 70 and the ball unit 75 (that is, the balls 79 are provided with play), so that the ball unit 75 can be slid between the clutch cam plate 80 and the receiving plate 70. Therefore, an urging spring (compression coil spring) 90 for urging the ball unit 75 in the direction of being slid toward the clutch cam plate 80 is mounted to the outer periphery portion of the retainer fitting portion 67 of the boss member 65 as shown in FIG. 4.

One end of the urging spring 90 comes into abutment with the retainer 76, and the other end thereof comes into abutment with a shoulder portion between the retainer fitting portion 67 and the receiving plate connecting portion 68 of the boss member 65. An urging force of the urging spring 90 is set to be sufficiently smaller than an urging force of the clutch spring 31. A C-ring 91 is fitted to a ring groove 69 formed on the outer periphery portion of the retainer fitting portion 67, so that the ball unit 75 is restricted from coming out from the boss member 65.

In the clutch release mechanism 40 configured as describe above, when the balls 79 of the ball unit 75 are accommodated between the cam-like recesses 72 of the receiving plate 70 and the cam-like recesses 83 of the clutch cam plate 80, that is, when the clutch release mechanism 40 is not in operation, the pressurizing plate 27 of the clutch device 20 presses the friction disks 24, 25 group against the pressure-receiving plates 26 with an urging force (resilient force) of the clutch spring 31 to bring the drive friction disk 24 and the driven friction disk 25 to frictional engagement with respect to each other. Thus, the clutch device 20 is in the engaged state (ON state). Therefore, the drive force of the engine 2 is transmitted from the crankshaft 3 to the transmission 4.

In a state in which the clutch device 20 is in the engaged state (ON state), the gap is defined between the clutch cam plate 80 or the receiving plate 70 and the ball unit 75 in order to ensure the mutual frictional engagement between the drive friction disk 24 and the driven friction disk 25. The adjustment of the gap is achieved by loosening the nut 64 and rotating the adjustment bolt 60 to the right or left direction by an adequate angle to move the boss member 65 and the receiving plate 70 toward or apart from the ball unit 75 and the clutch cam plate 80.

At this time, the ball unit 75 is urged in the direction of being slid toward the clutch cam plate 80 using the urging spring 90 attached to the outer peripheral portion of the boss member 65. Accordingly, when the clutch release mechanism 40 is not in operation, the ball unit 75 comes apart from the receiving plate 70. Thus, the balls 79 are brought into the loosely fitted state, while the balls 79 are brought into abutment with the cam-like recesses 83 of the clutch cam plate 80 by the urging spring 90. Therefore, vibrations of the balls 79 can be restrained while allowing the balls 79 to be loosely fitted to ensure the engaged state of the clutch device 20 when the clutch release mechanism is not in operation. In addition, since the C-ring 91 for restricting the ball unit 75 from coming out from the boss member 65 is mounted to the ring groove 69 formed on the outer peripheral portion of the boss member 65, the possibility that the ball unit 75 or the urging spring 90 comes out from the boss member 65 when assembling the clutch release mechanism 40 can be eliminated. Thus, the assembleability of the clutch release mechanism 40 can be improved.

When the change spindle 85 is rotated by a rotating operation of a change pedal, not shown, to shift gears, the clutch cam plate 80 is firstly rotated by the clutch arm 86 which rotates together with the change spindle 85. Then, the balls 79 of the ball unit 75 roll smoothly upwardly on inclined surfaces of the cam-like recesses 83 of the clutch cam plate 80, and press the clutch cam plate 80 toward the clutch device 20 along the plate supporting portion 66 of the boss member 65. Subsequently, the clutch cam plate 80 presses the release plate 29 of the clutch device 20 via the release bearing 55 and the collar member 50.

Consequently, the release plate 29 moves the pressurizing plate 27 rearwardly while compressing the clutch spring 31 via the supporting boss 28. Thus, the frictional engagement between the drive friction disk 24 and the driven friction disk 25 is released so that the engaged state of the clutch device 20 can be released (the clutch device 20 can be brought into the OFF state) and the transmission of the motive power from the crankshaft 3 to the main shaft 10 is disconnected. Accordingly, the gear shifting of the transmission 4 in association with the rotation of the change spindle 85 is achieved.

When the change spindle 85 is returned to its original position after having shifted the gears, the clutch cam plate 80 is restored to the initial rotational position by the clutch arm 86. Thus, the pressurizing plate 27 is returned to the original position by the urging force (resilient force) of the clutch spring 31 to press the friction disks 24, 25 group against the pressure-receiving plate 26 and, at the same time, press the release plate 29 rearwardly. Accordingly, the balls 79 of the ball unit 75 are accommodated in the cam-like recesses 72, 83 of the receiving plate 70 and the clutch cam plate 80 so that the clutch device 20 can be brought into the engaged state (the ON state) again.

Consequently, according to the clutch release mechanism 40 configured as described above, since the urging spring 90 for urging the ball unit 75 in the direction of being slid toward the clutch cam plate 80 is attached to the outer peripheral portion of the boss member 65, when the clutch release mechanism 40 is not in operation, the ball unit 75 comes apart from the receiving plate 70. "Thus, the balls are brought into the loosely fitted state while the balls 79 are brought into abutment with the cam-like recesses 83 of the clutch cam plate 80 by the urging spring 90. Therefore, vibrations of the balls 79 can be restrained while allowing the ball 79 to be loosely fitted to ensure the engaged state of the clutch when the clutch release mechanism 40 is not in operation. In addition, since the C-ring 91 for restricting the ball unit 75 from coming out from the boss member 65 is mounted to the ring groove 69 formed on the outer peripheral portion of the boss member 65, the possibility that the ball unit 75 or the urging spring 90 comes out from the boss member 65 when assembling the clutch release mechanism 40 can be eliminated. Thus, the assembleability of the clutch release mechanism 40 can be improved.

Since the gap G is defined between the outer peripheral surface of the outer race 56 of the release bearing 55 and the inner peripheral surface of the collar member 50, eccentricity generated between the clutch release mechanism 40 and the clutch device 20 can be absorbed with a simple configuration.

Although the ball unit 75 has the three balls 79 in the embodiment described above, the invention is not limited thereto, and any number of balls 79 is acceptable.

Although the urging spring 90 as a compression coil spring is used as an urging member for urging the ball unit 75 in the direction of being slid toward the clutch cam plate 80 in the above-described embodiment, the invention is not limited thereto, and a leaf spring or the like may also be used.

Although the C-ring 91 is used for restricting the ball unit 75 from coming out from the boss member 65 in the embodiment described above, the invention is not limited thereto, and other members may be used as long as they are the members which can restrict the ball unit 75 from coming out from the boss member 65.

Weight reduction of the clutch cam plate 80 shown in FIG. 5 and the receiving plate 70 shown in FIG. 7 is achieved by removing portions thereof which do not come into abutment with the balls 79.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch release mechanism for releasing engagement of a clutch device comprising:
 a collar member for pressing a pressurizing plate of the clutch device in the direction of releasing engagement of the clutch device;
 a bearing provided inside the collar member;
 a clutch cam plate rotatably connected to the collar member via the bearing;
 an adjustment bolt held by a case member for covering the clutch device coaxially with an axis of rotation of the clutch cam plate;
 a boss member screwed on the adjustment bolt and formed so as to extend from the adjustment bolt to at least the clutch cam plate coaxially with the axis of rotation of the clutch cam plate;
 a receiving plate connected to the peripheral portion of the boss member so as to extend substantially in parallel with the clutch cam plate; and
 a ball unit having a retainer fitted to the boss member so as to be positioned between the clutch cam plate and the receiving plate and a plurality of balls rotatably retained by the retainer so as to be arranged in the direction of rotation of the clutch cam plate and configured so that portions exposed when being held by the retainer are engaged respectively with a plurality of cam-like recesses provided on the clutch cam plate,
 wherein a gap is defined between the clutch cam plate or the receiving plate and the ball unit so that the ball unit can slide between the clutch cam plate and the receiving plate, and
 an urging member for urging the ball unit in the direction of being slid toward the clutch cam plate and a retaining member for restricting the ball unit from coming out from the boss member are attached to the peripheral portion of the boss member.

2. The clutch release mechanism according to claim 1, wherein the inner surface of the collar member is configured to be capable of coming into abutment with the outer peripheral surface and the side surface facing the clutch device of an outer race which constitutes the bearing, the clutch cam plate is formed with a cylindrical projecting portion extending coaxially with the axis of rotation of the clutch cam plate to rotatably support the cylindrical projecting portion on the outer peripheral portion of the boss member so as to be capable of rotating coaxially with the axis of rotation thereof, and the cylindrical projecting portion is arranged inside an inner race which constitutes the bearing and a gap is defined between the outer peripheral surface of the outer race and the inner surface of the collar member so as to extend radially of the bearing.

3. The clutch release mechanism according to claim 1, wherein the clutch cam plate is integrally formed with a driven arm extending radially from a cylindrical projecting portion of said clutch cam plate that is mounted on said boss member.

4. The clutch release mechanism according to claim 1, wherein the urging force of the urging member is less than the urging force of a clutch spring.

5. The clutch release mechanism according to claim 1, wherein when the plurality of balls of the ball unit are accommodated between cam-like recesses of the receiving plate the and cam-like recesses of the clutch cam plate, the clutch release mechanism is not in operation and the clutch device is in an engaged state.

6. The clutch release mechanism according to claim 5, wherein when the clutch device is in the engaged state, the gap defined between the clutch cam plate or the receiving plate and the ball unit may be adjusted by adjusting the adjustment bolt.

7. The clutch release mechanism according to claim 1, and further including a C-ring mounted on said boss member for restricting the ball unit from being displaced from the boss member.

8. The clutch release mechanism according to claim 1, wherein upon operation of a change spindle, the clutch cam plate is rotated by a clutch arm wherein the plurality of balls roll smoothly upward on inclined surfaces of the cam-like recesses of the clutch cam plate for pressing the clutch cam plate towards the clutch device.

9. The clutch release mechanism according to claim 1, wherein the gap is defined between an outer peripheral surface of the outer race of a release bearing and an inner peripheral surface of the collar member for absorbing eccentricity generated between the clutch release mechanism and the clutch device.

10. The clutch release mechanism according to claim 1, wherein three balls are rotatably retained by the retainer.

11. A clutch release mechanism adapted for use with a clutch device comprising:
a collar member adapted for pressing a pressurizing plate;
a bearing provided inside the collar member;
a clutch cam plate rotatably connected to the collar member via the bearing;
an adjustment bolt coaxially arranged with an axis of rotation of the clutch cam plate;
a boss member mounted on the adjustment bolt and formed so as to extend from the adjustment bolt to at least the clutch cam plate coaxially with the axis of rotation of the clutch cam plate;
a receiving plate connected to the peripheral portion of the boss member so as to extend substantially in parallel with the clutch cam plate; and
a ball unit having a retainer fitted to the boss member so as to be positioned between the clutch cam plate and the receiving plate and a plurality of balls rotatably retained by the retainer so as to be arranged in the direction of rotation of the clutch cam plate and configured so that portions exposed when being held by the retainer are engaged respectively with a plurality of cam-like recesses provided on the clutch cam plate, wherein a gap is defined between the clutch cam plate or the receiving plate and the ball unit so that the ball unit can slide between the clutch cam plate and the receiving plate, and an urging member for urging the ball unit in the direction of being slid toward the clutch cam plate and a retaining member for restricting the ball unit from coming out from the boss member are attached to the peripheral portion of the boss member.

12. The clutch release mechanism according to claim 11, wherein the inner surface of the collar member is configured to be capable of coming into abutment with the outer peripheral surface and the side surface facing the clutch device of an outer race which constitutes the bearing, the clutch cam plate is formed with a cylindrical projecting portion extending coaxially with the axis of rotation of the clutch cam plate to rotatably support the cylindrical projecting portion on the outer peripheral portion of the boss member so as to be capable of rotating coaxially with the axis of rotation thereof, and the cylindrical projecting portion is arranged inside an inner race which constitutes the bearing and a gap is defined between the outer peripheral surface of the outer race and the inner surface of the collar member so as to extend radially of the bearing.

13. The clutch release mechanism according to claim 11, wherein the clutch cam plate is integrally formed with a driven arm extending radially from a cylindrical projecting portion of said clutch cam plate that is mounted on said boss member.

14. The clutch release mechanism according to claim 11, wherein the urging force of the urging member is less than the urging force of a clutch spring.

15. The clutch release mechanism according to claim 11, wherein when the plurality of balls of the ball unit are accommodated between cam-like recesses of the receiving plate and the cam-like recesses of the clutch cam plate, the clutch release mechanism is not in operation and the clutch device is in an engaged state.

16. The clutch release mechanism according to claim 15, wherein when the clutch device is in the engaged state, the gap defined between the clutch cam plate or the receiving plate and the ball unit may be adjusted by adjusting the adjustment bolt.

17. The clutch release mechanism according to claim 11, and further including a C-ring mounted on said boss member for restricting the ball unit from being displaced from the boss member.

18. The clutch release mechanism according to claim 11, wherein upon operation of a change spindle, the clutch cam plate is rotated by a clutch arm wherein the plurality of balls roll smoothly upward on inclined surfaces of the cam-like recesses of the clutch cam plate for pressing the clutch cam plate towards the clutch device.

19. The clutch release mechanism according to claim 11, wherein the gap is defined between an outer peripheral surface of the outer race of a release bearing and an inner peripheral surface of the collar member for absorbing eccentricity generated between the clutch release mechanism and the clutch device.

20. The clutch release mechanism according to claim 11, wherein three balls are rotatably retained by the retainer.

* * * * *